US005422161A

United States Patent [19]

Ohbachi et al.

[11] Patent Number: 5,422,161

[45] Date of Patent: Jun. 6, 1995

[54] LASER-MARKED THERMOPLASTIC ARTICLES

[75] Inventors: Yoshinori Ohbachi; Hisashi Tomita, both of Shizuoka, Japan

[73] Assignee: Polyplastics Co., Ltd., Osaka, Japan

[21] Appl. No.: 226,863

[22] Filed: Apr. 13, 1994

Related U.S. Application Data

[62] Division of Ser. No. 952,418, Sep. 29, 1992, Pat. No. 5,346,802.

[30] Foreign Application Priority Data

Oct. 2, 1991 [JP] Japan .................................. 3-255204

[51] Int. Cl.[6] .......................... B32B 3/10; D06N 7/04; G03C 1/494; G03C 5/44

[52] U.S. Cl. ..................................... 428/141; 428/480

[58] Field of Search ............... 430/270, 346, 495, 945, 430/947; 428/141, 142

[56] References Cited

U.S. PATENT DOCUMENTS 5,035,983 7/1991 Kiyonari et al. .................... 430/346

*Primary Examiner*—George F. Lesmes
*Assistant Examiner*—Kathryne E. Shelborne
*Attorney, Agent, or Firm*—Nixon & Vanderhye

[57] ABSTRACT

Laser-marks (such as indicia, characters, symbols, patterns and the like) of exceptionally clear and unambiguous quality may be inscribed on the surface of an article whose surface region to be laser-marked is formed of a thermoplastic resin composition having a critical oxygen index of 22% or above as determined by ASTM D2863. The entire article may be formed (molded of such a thermoplastic resin composition, or the article may include a non-thermoplastic core having a surface layer thereof of the thermoplastic resin composition. Preferably, the thermoplastic resin composition is a polybutylene terephthalate with one or more flame retardants which impart the requisite critical oxygen index thereto.

3 Claims, No Drawings

LASER-MARKED THERMOPLASTIC ARTICLES

This is a divisional of application Ser. No. 07/952,418, filed Sep. 29, 1992, now U.S. Pat. No. 5,346,802.

FIELD OF INVENTION

The present invention generally relates to processes for laser-marking thermoplastic articles and to the resultant laser-marked thermoplastic articles. More specifically, the present invention is embodied in a process whereby unambiguous marks may reliably and reproducibly be made on a surface of a thermoplastic article by irradiating the surface of the article with laser light.

BACKGROUND AND SUMMARY OF THE INVENTION

Several prior art techniques have been proposed in the art for the high speed reproducible marking of thermoplastic articles using laser irradiation. In general, the prior art proposals include incorporating a material which is capable of selectively absorbing laser irradiation so as to locally heat the thermoplastic and thereby induce localized thermal change, for example, through melting, evaporation or carbonization, in the article's surface.

For example, Japanese Patent Publication No. 1495/1981 discloses a laser-marking technique whereby a dye and a silicon-containing inorganic compound or a silicon-containing dye are incorporated into the material to be molded; Japanese patent Publication No. 118926/1984 discloses a method whereby a radiation-absorbing substance, such as a metal silicate is added to the molding material; Japanese Patent Publication No. 187050/1984 discloses a technique whereby at least 20% of hydrated alumina is added as an organic filler; Japanese Patent Publication No. 204888/1990 discloses a technique whereby a pigment containing a phosphate is added to the molding material; Japanese Patent Publication No. 48984/1990 discloses a technique whereby a non-black inorganic lead compound is incorporated into the molding material; Japanese Publication No. 10884/1991 discloses incorporating a non-white metal titanate into the molding material; Japanese Publication No. 155493 discloses incorporating a black organic dye into the molding material; and Japanese Patent Publication No. 166488/1985 discloses incorporating a metal hydroxide and/or a water-containing metal compound and a colorant.

As can be appreciated, while incorporating a variety of materials into the thermoplastic to be laser-marked may result in adequate marking characteristics, there is a risk that the additive which is incorporated into the thermoplastic so as to enhance its laser-marking properties could deleteriously affect the thermoplastic's inherent and advantageous physical properties. Furthermore, the incorporation of such additives into a thermoplastic resin typically results in a more complex (and costly) compounding procedure.

What has been needed in the art, therefore is a laser-marking process for thermoplastic resins whereby the addition of special additives for laser marking may be obviated. It is towards fulfulling such a need that the present invention is directed.

In this connection, the present invention relates to processes for laser-marking surfaces of thermoplastic articles whereby at least the surface region of the thermoplastic article has a critical oxygen index of 22% or above as determined by ASTM D2863. More specifically, it has been found that very sharp, unambiguous black markings (such as indicia, characters, symbols, patterns and the like) may be made with high speed and with reproducible reliability by means of laser irradiation if at least the surface of the thermoplastic article to be marked has a critical oxygen index according to ASTM D2863 of 22% or above.

Further aspects and advantages of this invention will become more clear after careful consideration is given to the detailed description of the preferred exemplary embodiments thereof which follows.

DETAILED DESCRIPTION OF THE PREFERRED EXEMPLARY EMBODIMENTS

The present invention is especially characterized by the ability of laser irradiation to mark a thermoplastic resin article having a critical oxygen index of 22% or above as determined by ASTM D2863 at its surface. In this regard, the entire thermoplastic article may be made from a thermoplastic molding composition whose critical oxygen index is 22% or above, or alternatively, the article may be formed from a non-thermoplastic core material (e.g., ceramic or metal) which is surface-coated with a thermoplastic having a critical oxygen index of 22% or above.

It has been discovered that when laser-marking of a thermoplastic composition having a critical oxygen index of less than 22% is attempted, unclear and insufficiently contrasting markings result. Preferably, the thermoplastic resin (which as noted above can constitute the entire article or a surface layer of the article) that is employed in the processes of this invention will have a critical oxygen index of 25% or above, and more preferably a critical oxygen index of 28% or above. The use of such a thermoplastic resin at the surface of the article to be surface-marked by laser will result in very sharp (i.e., non-blurred, high contrasting) black markings to be formed.

As used herein and in the accompanying claims, the term "critical oxygen index" is meant to refer to the minimum oxygen concentration in the thermoplastic-resin expressed in percent by volume which is required for continuously burning a sample in a gas mixture (oxygen/nitrogen) at room temperature under given conditions according to ASTM D2863. The critical oxygen index thus typically serves as an indication of the flame-retardancy of a thermoplastic resin.

The thermoplastic resin composition that may be used in the present invention is not particularly restricted, provided that it satisfies the critical oxygen index requirement as mentioned above. It is, however, preferred to use a thermoplastic resin which may not inherently have a critical oxygen index as noted above, but whose critical oxygen index may be adjusted to 22% or above by the addition of various flame-retardants and/or flame-retardant auxiliaries, since particularly desirable laser-marking can be achieved with such thermoplastic resins. In particular, thermoplastic resin compositions comprised predominantly of polyalkylene terephthalates, such as polybutylene terephthalate (PBT) or polyethylene terephthalate (PET), blended with one or more flame-retardant are preferred.

Flame retardants can be classified am either an organic or an inorganic type. Examples include phosphorus-containing flame retardants, halogen-containing flame retardants, chlorine-containing flame retardants and antimony-containing flame retardants. The present invention is not restricted to any particular thermoplastic/flame retardant composition, but instead virtually any flame retardant may be employed in dependence upon the thermoplastic base resin with which it is blended, provide that it can impart flame-retardancy to the thermoplastic resin composition and achieve a critical oxygen index of 22% or above.

The amounts by which such flame retardants may be incorporated are likewise not specifically limited. Thus, flame retardants may be added to the thermoplastic base resin in virtually any amount so as to impart a critical oxygen index of 22% or above, with consideration being given to the particular thermoplastic resin and flame retardant(s) being employed.

According to the present invention, the thermoplastic resin composition as noted above may be molded into a desired article using conventional techniques, or a core element of the article may be surface-coated with the thermoplastic resin composition and then subjected to laser-marking. The thermoplastic material to be laser-marked may contain other additives, if required, which are typically incorporated into thermoplastic resins generally, provided that the incorporation of such additives will not decrease the critical oxygen index of the thermoplastic to below 22%. For example, a variety of stabilizers, such as UV-absorbers, antistatic agents, colorants, such as dyes and pigments, lubricants, plasticizers, mold-release agents, surfactants, crystallization accelerators and nucleating agents may be incorporated into the thermoplastic resin composition to be laser-marked according to this invention. Furthermore, fibrous, flaky or granular inorganic compounds, for example, glass fibers, glass flakes, mica and glass beads, may be added to the thermoplastic composition.

According to the present invention, very sharp and unambiguous marking of the surface of a thermoplastic article can be effected by simply irradiating the desired parts of the molded article with a laser. In this connection, in order to obtain marks of desired shape on the surface of the article, the articles' surface may be selectively scanned with a spot of a laser beam having the appropriate size. Alternately, a laser beam is masked to thereby give a desired shape and then the surface of the molded article to be marked is irradiated with the masked laser beam.

The laser irradiation that may be employed in the processes of the present invention is not particularly restricted. Examples of useable lasers include carbon dioxide lasers, ruby lasers, semiconductor lasers, argon lasers, examiner lasers and YAG lasers. Among these, a ND:YAG laser having a wavelength of 1.08 μm is particularly preferred. The oscillation type of laser may be either continuous or pulsed. A Q-switched scanning Nd:YAG laser of a continuous oscillation type is particularly suitable.

As described above, the laser-marking process according to the present invention includes irradiating the surface of a molded article made from a thermoplastic resin composition having a critical oxygen index of 22% or above as determined by ASTM D2863. The resulting laser-marked thermoplastic surface will exhibit exceptionally clear and unambiguous black markings without deteriorating the inherent beneficial characteristics associated with the thermoplastic resin generally. Furthermore, these attributes of the present invention are realized with the added benefit of high speed marking of article surfaces, as well as ease of automation and process management. Thus, the process of this invention is highly useful in practice.

The present invention will be further illustrated by the following non-limiting Examples.

Examples 1 to 4 and Comparative Examples 1 to 3

A number of test plates (50 mm×70 mm×3 mm) were made from thermoplastic resin compositions identified in Table 1 below comprised of PBT and a flame-retardant/flame-retardant auxiliary so that each composition had a critical oxygen index of 22% or above. The test plates were then marked with the use of a scanning Nd:YAG laser (Laser Marker SL475E, manufactured by NEC Corporation), using the following marking conditions:

- Laser oscillator: SL114K
- Laser Type: Continuous Oscillation Type Nd:YAG laser
- Output: 50 W or above
- Number of marked characters: 40
- Marking method: One Stroke
- Power at Marked Part: 1 W
- Scanning Speed: 100 mm/sec
- Bite Size: 30 μm
- Q-switch Frequency: 3 kHz
- Treatment Time: 3 seconds For comparison, test plates formed of resin compositions having a critical oxygen index less than 22% were subjected to similar laser-marking procedures. Table 1 below summarizes the results.

TABLE 1

| | Resin composition | | | | | |
|---|---|---|---|---|---|---|
| | resin | flame retardant/ flame retardant aid | glass fiber (wt. %) | Critical oxygen index (%) | Laser used | Marking state*1 |
| Ex. 1 | PBT | contained | — | 24.0 | Nd:YAG | o |
| Ex. 2 | PBT | contained | 30 | 23.3 | Nd:YAG | o |
| Ex. 3 | PBT | contained | 30 | 26.7 | Nd:YAG | • |
| Ex. 4 | PBT | contained | 30 | 29.6 | Nd:YAG | • |
| C. Ex. 1 | PBT | — | — | 20.5 | Nd:YAG | Δ |
| C. Ex. 2 | PBT | — | 30 | 20.5 | Nd:YAG | Δ |
| C. Ex. 3 | PBT | contained | 30 | 21.6 | Nd:YAG | Δ |

*1marking state (contrast):
•: very good,
o: good,
Δ: thin,
x: unclear.

As can be seen from the data presented above, laser-markings of exceptional quality can be formed on thermoplastic articles if the surface of the article to be laser-marked has a critical oxygen index of 22% or above.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A laser-marked article at least a surface region of which is formed of a thermoplastic resin composition which consists essentially of polybutylene terephthalate, and a flame retardant in an amount sufficient to impart to said thermoplastic resin composition a critical oxygen index of 22% or above as determined by ASTM D2863, and a black laser-mark inscribed on said thermoplastic surface region.

2. The laser-marked article as in claim 1, wherein the article is formed entirely of said thermoplastic resin composition having a critical oxygen index of 22% or above.

3. The laser-marked article as in claim 1, wherein the article includes a non-thermoplastic core, and a surface layer on said core which consists essentially of said thermoplastic resin composition having a critical oxygen index of 22% or above.

* * * * *